United States Patent [19]

Penney

[11] Patent Number: 5,786,871
[45] Date of Patent: Jul. 28, 1998

[54] CONSTANT LUMINANCE CORRECTOR

[75] Inventor: Bruce J. Penney, Aloha, Oreg.

[73] Assignee: Tektronix, Inc., Wilsonville, Oreg.

[21] Appl. No.: 625,381

[22] Filed: Apr. 1, 1996

[51] Int. Cl.$^6$ .................................................. H04N 5/21
[52] U.S. Cl. .......................................... 348/609; 348/645
[58] Field of Search ............................... 348/609, 645, 348/642, 671, 674, 666, 631, 254, 256

[56] References Cited

U.S. PATENT DOCUMENTS

| | | | |
|---|---|---|---|
| 4,969,033 | 11/1990 | Yamada et al. | 348/609 |
| 5,235,413 | 8/1993 | Knierim | 358/37 |
| 5,355,176 | 10/1994 | Inagaki et al. | 348/609 |
| 5,483,294 | 1/1996 | Kays | 348/609 |

*Primary Examiner*—Amelia Au
*Attorney, Agent, or Firm*—Francis I. Gray

[57] ABSTRACT

A constant luminance corrector for a television system determines brightness information that is discarded in the chrominance channels of an encoder, and adds it to the luminance channel of the encoder. Gamma-corrected luminance and chrominance component signals from a video source, such as a video camera, video tape recorder or the like, are input to the encoder which outputs an encoded luminance component signal and an encoded chrominance component signal that are combined to form a composite signal. The gamma-corrected component signals also are input to a luminance predictor circuit, or alternatively in lieu of the gamma-corrected chrominance component signals a coded chrominance signal and a discarded chrominance signal from the encoder may be input to the luminance predictor circuit. Likewise the encoded luminance component signal may be input to the luminance predictor circuit in lieu of the gamma-corrected luminance component signal. From these signals the luminance predictor circuit produces an ideal and an actual luminance component signal for comparison. A luminance correction signal, representing the lost brightness information, is produced from the difference between the ideal and actual luminance component signals. The luminance correction signal is input to the luminance channel of the encoder for combination with the gamma-corrected luminance signal to restore the brightness lost in the chrominance channels to the luminance channel.

17 Claims, 3 Drawing Sheets

IDEAL TELEVISION SYSTEM

ACTUAL TELEVISION SYSTEM

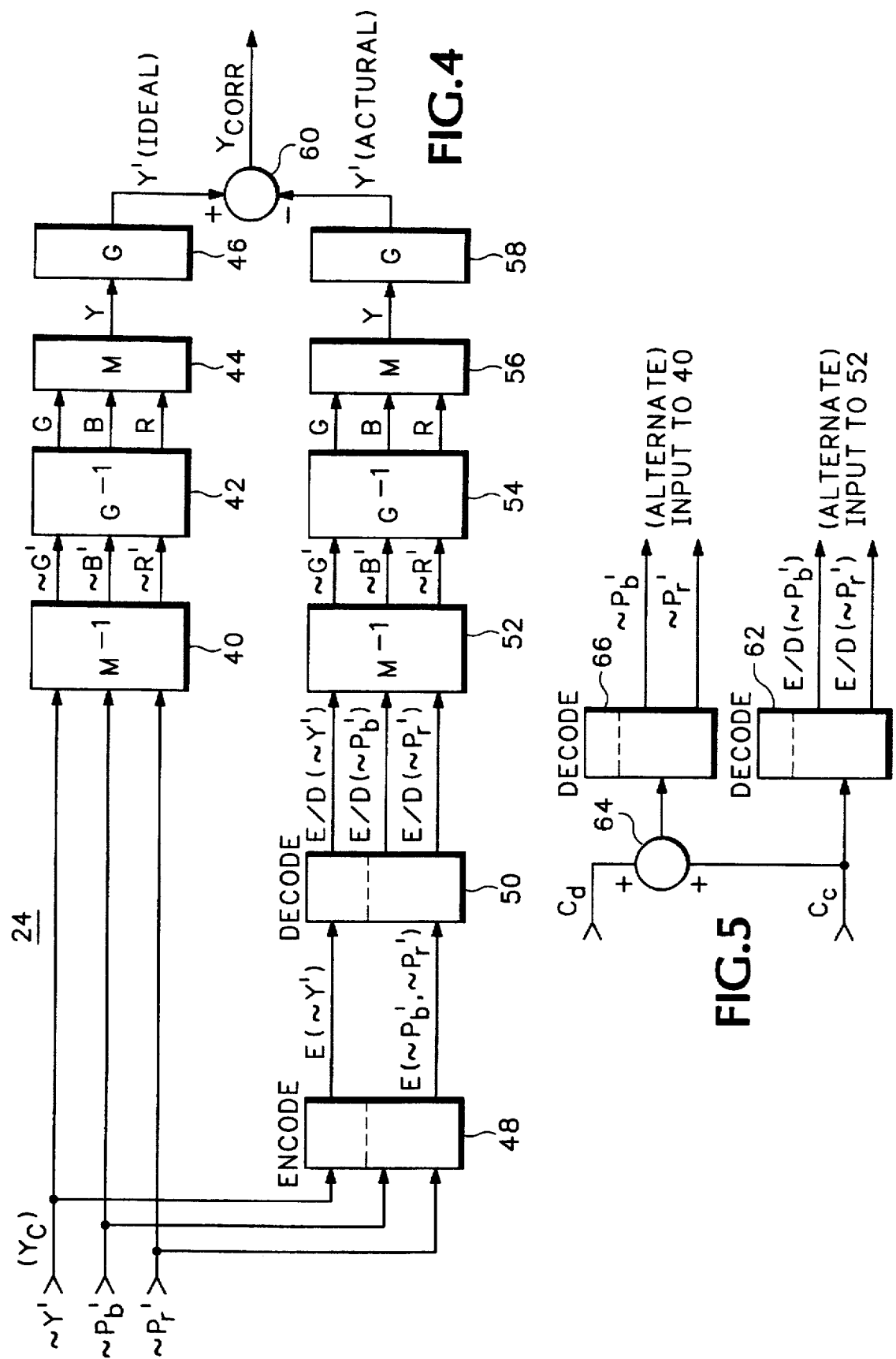

CONSTANT LUMINANCE CORRECTOR

BACKGROUND OF THE INVENTION

The present invention relates to the encoding of video signals, and more particularly to a constant luminance corrector for correcting the brightness of the luminance channel of an encoder to account for brightness information lost in chrominance channels during encoding.

In an ideal television system as shown in FIG. 1 a pickup device, such as a video camera, scans an image and forms three primary color signals, typically green, blue and red (GBR). These color signals are converted by a matrix into three new component signals having a luminance component (Y) and two color difference components (Pb, Pr or B-Y, R-Y), the coefficients for the matrix being a function of the particular television standard. The component signals are then gamma corrected in accordance with the well-known Weber-Fechtner relation, which represents the dynamic response of the human eye as being approximately logarithmic. The gamma-corrected luminance (Y') and color difference signals (Pb', Pr') may then be encoded into a composite video signal, such as NTSC or PAL, for transmission. At the receiving end a decoder converts the composite video signal into the gamma-corrected component signals, which in turn are converted by an inverse gamma circuit into the component signals. The component signals are then input to an inverse matrix to reproduce the original GBR signals for display. Such an ideal system has all of the brightness information processed by the luminance channel, which is commonly called a "constant luminance" system.

In the history of color television the first common display devices were cathode ray tubes (CRTs) in which the red, green and blue phosphors used inherently had nonlinear transfer characteristics. The CRT transfer characteristic happens to be very close to the ideal inverse gamma characteristic. Since this gamma characteristic, being actually in the CRT, is located after dematrixing the luminance and color difference signals to obtain the GBR signals, gamma correction for the pickup devices traditionally occurs prior to matrixing the GBR signals into the luminance and color difference signals, usually immediately after the pickup device as shown in FIG. 2. Gamma correction compresses the dynamic range of the GBR signals to improve the subjective system signal to noise ratio for low brightness elements at the expense of a lessened signal to noise ratio for high brightness elements in accordance with the Weber-Fechtner relation as discussed above.

Since in the actual, rather than the ideal, system the luminance and color difference signals are derived from the gamma-corrected GBR signals using a linear matrix, the color difference signals substantially contribute to the apparent brightness of a picture element, particularly in the case of highly saturated colors. Thus, gamma correction of the individual GBR signals instead of the luminance and color difference signals results in the signal that is being sent through the luminance channel not actually being the ideal luminance signal, i.e., not actually containing all of the brightness content, but rather an approximation. For pictures with low saturation the error is small, but for saturated colors significant brightness information is sent through the chrominance channels. In order to conserve transmission bandwidth, television systems commonly take advantage of a psycho-visual characteristic which allows the color difference signals to be processed at reduced bandwidth compared to the full luminance bandwidth. Since the chrominance channels in composite systems, such as NTSC and PAL, usually are band limited at the encoder, and since some of the brightness information is actually in the color channels, important brightness information is lost as a result of band-limiting the color signals. Additionally some television systems use a linear matrix that is not derived from the coefficients for the phosphors of the display, resulting in errors in the apparent brightness of even neutral colors when chrominance errors are present.

Video compression systems, such as JPEG or MPEG, also operate on luminance and color difference signals. Like the composite NTSC or PAL systems already discussed, these compression systems rely on psycho-visual characteristics which permit reducing the bandwidth of the color difference signals compared to the bandwidth of the luminance signals. In JPEG and MPEG the color difference signals are quantized with less precision than the luminance signals, and some high frequency information may be deleted. As discussed for composite systems, the color information lost may actually include some luminance information.

What is desired is an encoder that anticipates the true brightness information that is lost in the chrominance channels and applies an appropriate correction to the luminance channel before transmission.

SUMMARY OF THE INVENTION

Accordingly the present invention provides a constant luminance corrector for extracting lost brightness information from the chrominance channels and adding it back into the luminance channel prior to encoding. Gamma-corrected component signals having a luminance component and a pair of color difference chrominance components are input to respective channels of an encoder, the luminance channel being a wideband channel and the chrominance channels usually being band limited. The output from the encoder is a coded luminance signal and a coded chrominance signal which are combined for transmission. The portions of the chrominance channels that are discarded by the band limiting may also be provided as an optional discarded chrominance signal from the encoder. The gamma-corrected component signals are input to a luminance predictor circuit. The encoded luminance signal may replace the gamma-corrected luminance component signal and the encoded chrominance signal with the discarded chrominance signal may replace the gamma-corrected chrominance component signals. From these signals the luminance predictor circuit produces a luminance correction signal corresponding to the lost brightness information from the chrominance channels. The luminance correction signal is applied to the input of the luminance channel of the encoder to produce a corrected luminance signal that approximates a constant luminance signal for encoding. The luminance correction signal may be a 1-, 2- or 3-dimensional signal having horizontal, vertical and/or temporal information depending upon the color difference processing of the composite and/or compression system being used. The constant luminance corrector may be implemented in analog or digital hardware or may be implemented in software. In the case of digital hardware, the matrix, gamma, inverse matrix and inverse gamma circuits may use lookup tables. In case the lookup tables become too large, sparse tables with local interpolation may be used.

The objects, advantages and other novel features of the present invention are apparent from the following detailed description when read in conjunction with the appended claims and attached drawing.

BRIEF DESCRIPTION OF THE DRAWING

FIG. 4 is a block diagram of a first embodiment of a luminance predictor for a constant luminance corrector according to the present invention.

FIG. 5 is a block diagram of a second embodiment of a portion of a luminance predictor for a constant luminance corrector according to the present invention.

DESCRIPTION OF THE PREFERRED EMBODIMENT

Figure 1:
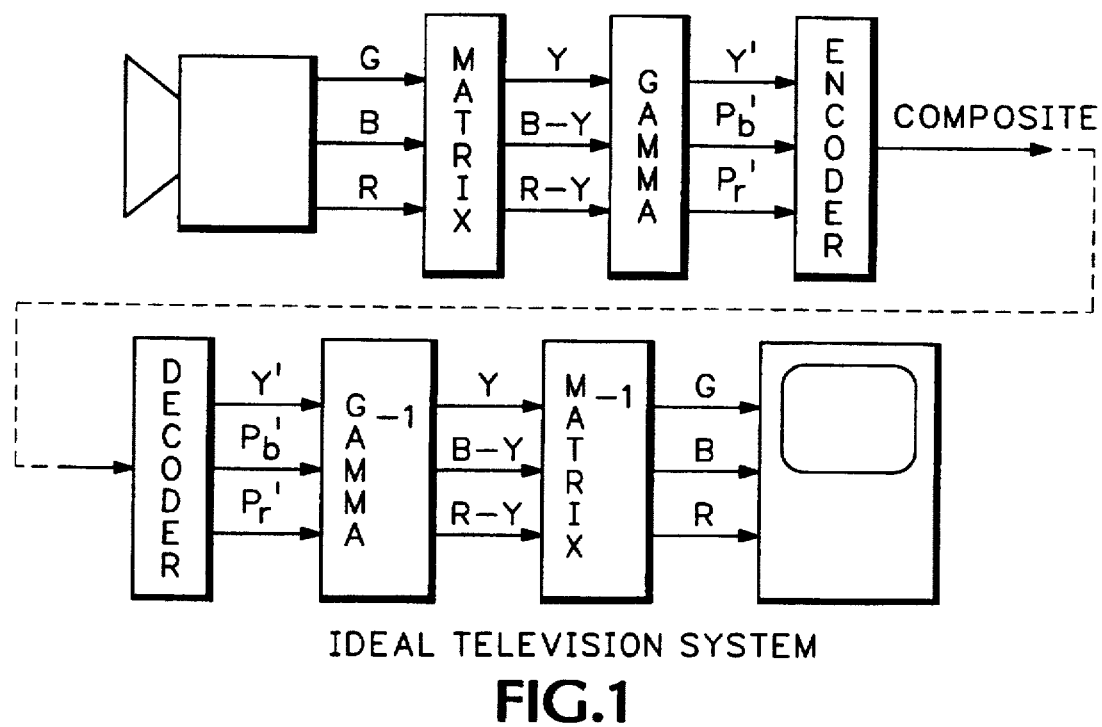
FIG. 1 is a block diagram view of an ideal television system.
Figure 2:
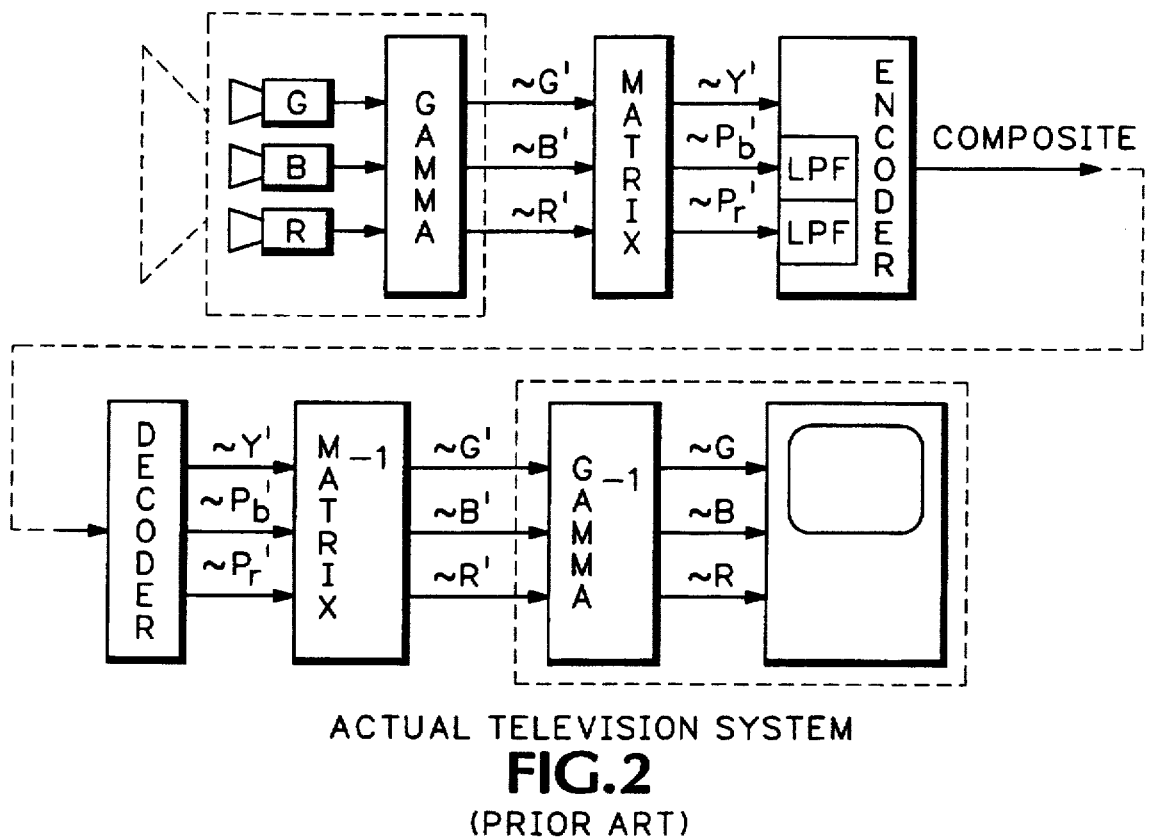
FIG. 2 is a block diagram view of an actual television system according to the prior art.
Figure 3:
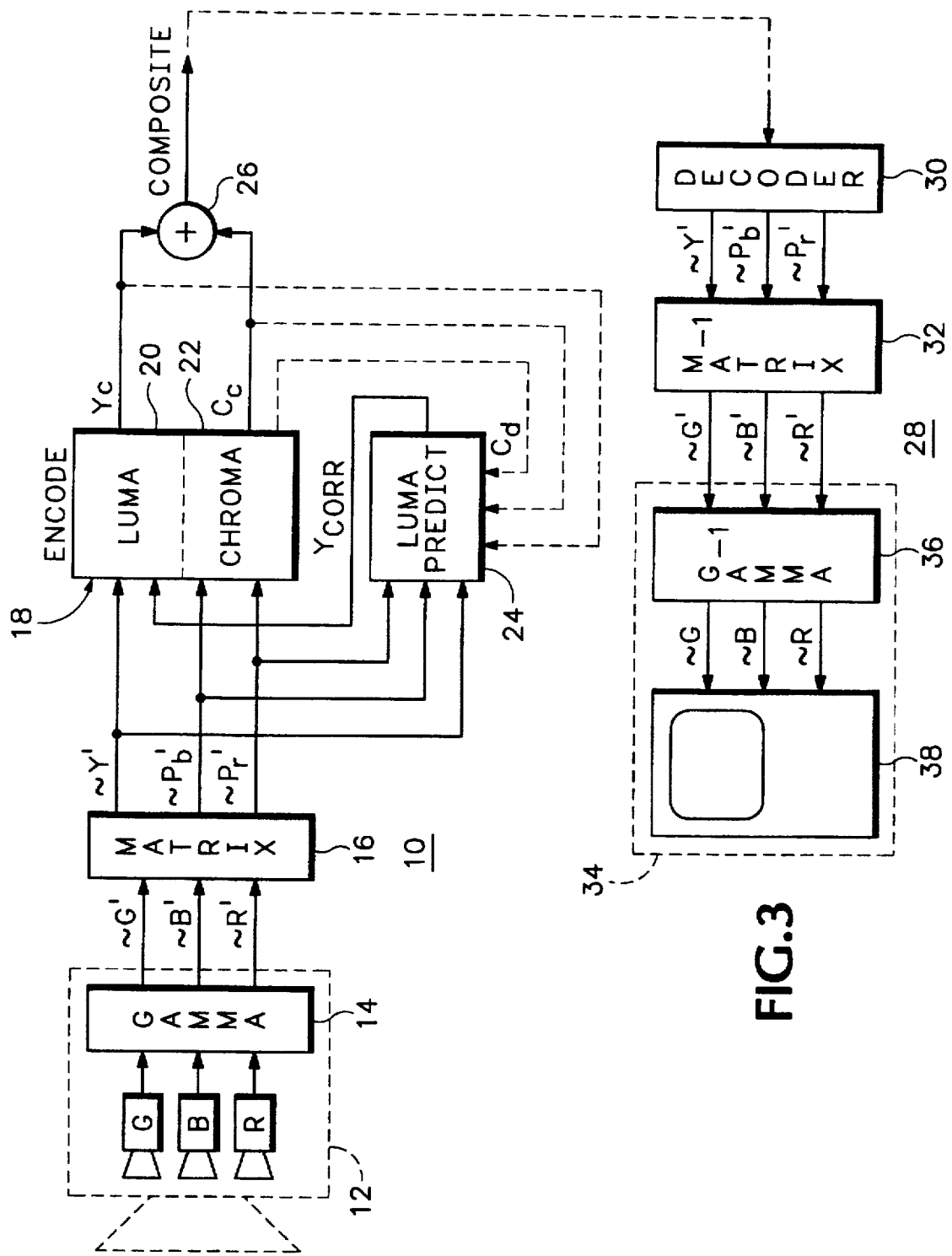
FIG. 3 is a block diagram of a television system including a constant luminance corrector according to the present invention.

Referring now to FIG. 3 a transmitter 10 incorporating constant luminance correction is shown for a television transmission system. A conventional pickup device 12 includes a gamma correction circuit 14 that converts scanned GBR signals into gamma-corrected GBR signals. The gamma-corrected GBR signals are input to a matrix 16 to produce gamma-corrected component signals (Y', Pb', Pr') including a luminance component and two color difference chrominance components. The gamma-corrected component signals are input to an encoder 18 having a wideband luminance channel 20 and narrow band (band limited) chrominance channels 22. The chrominance channels 22 have as outputs an encoded chrominance component signal (Cc) that is band limited, and optionally an out-of-band, or discarded, chrominance component signal (Cd). The gamma-corrected component signals from the matrix 16 are input to a luminance error predictor circuit 24. Alternatively the encoded and discarded chrominance component signals may be input to the luminance error predictor circuit 24 in lieu of the gamma-corrected chrominance component signals Pb', Pr'. The luminance signal input to the luminance error predictor circuit 24 may be taken from either the gamma-corrected luminance component signal input to the encoder or the encoded luminance component signal (Yc) output from the encoder. The luminance error predictor circuit 24 extracts the lost brightness information from the chrominance information and outputs a luminance correction signal (Ycorr). The luminance correction signal is added back to the gamma-corrected luminance signal at the input of the luminance channel 20. The encoded luminance and chrominance component signals are input to a combiner 26 to produce a composite signal for transmission.

The receiver 28 is conventional, having a decoder 30 to recover the gamma-corrected components from the composite signal, an inverse matrix 32 to convert the gamma-corrected components into gamma-corrected GBR signals, and a display device 34 which includes inherently inverse gamma correction 36, i.e., the phosphors of a CRT for example to approximately reproduce the original GBR signals on the display screen 38 less the luminance information lost in the chrominance channels 22 of the encoder 18.

The luminance predictor 24 implements a correction model. The correction model maps the errors of the two color difference component signals to a correction output. This mapping varies as a function of the luminance and chrominance values. Conceptually the simplest way to derive this correction model is actually to invert the matrix and gamma correction of the transmission circuit to get back to the primary GBR signals, and process the primary signals according to an ideal television system. The difference between the actual luminance and the ideal luminance as encoded is really brightness information. Therefore any of this brightness information which is discarded in the chrominance processing is reinserted into the luminance channel.

Referring now to FIG. 4 the luminance predictor circuit 24 is shown in greater detail. The gamma-corrected component signals (Y', Pb', Pr') are input to an inverse matrix 40 to recover the gamma-corrected GBR signals. The gamma-corrected GBR signals in turn are input to an inverse gamma correction circuit 42 to obtain the original GBR signals. Then the original GBR signals are processed by an "ideal" system of a matrix 44 followed by a gamma correction circuit 46 to provide a gamma-corrected luminance signal without any appreciable brightness error.

The gamma-corrected luminance and chrominance components, or the encoded luminance signal and the gamma-corrected chrominance components, are input to an encoder /decoder set 48, 50 to generate received luminance and chrominance components as at the output of the receiver decoder 30. These signals are then input to an inverse matrix circuit 52, an inverse gamma correction circuit 54, a matrix circuit 56 and a gamma correction circuit 58 in sequence to produce an "actual" gamma-corrected luminance component signal. The ideal and actual gamma-corrected luminance component signals are input to an output summation circuit 56 to produce the luminance correction signal (Ycorr).

Alternatively as shown in FIG. 5 the encoded chrominance component signal may be input to a decoder 62 to obtain the received chrominance component signals for input to the first matrix 40, and may be combined with the discarded chrominance component signal in a combiner 64 and decoded in a second decoder 66 to produce the gamma-corrected chrominance component signals for input to the second matrix 52. The resulting chrominance component signals replace those input to the inverse matrices 40, 52 of FIG. 4 and are process as described above to produce the luminance correction signal. The luminance correction signal may alternatively be derived from linear (no gamma corrected) luminance signals with appropriate gain corrections to compensate for the incremental gain variations of the gamma transfer function. Also the luminance correction signal may be a 1-, 2- or 3-dimensional signal having horizontal, vertical and/or temporal information depending upon the color difference processing of the composite and/or compression system being used. The constant luminance corrector may be implemented in analog or digital hardware or may be implemented in software. In the case of digital hardware, the matrix, gamma correction, inverse matrix and inverse gamma correction circuits may use lookup tables. In case the lookup tables become too large, sparse tables with local interpolation may be used.

Thus the present invention provides a constant luminance corrector by determining the amount of brightness being processed by the chrominance channels of an encoder through generating an ideal and an actual luminance component signal from the inputs and/or outputs of the encoder, which luminance component signals are combined to form a luminance correction signal that is added to the luminance channel of the encoder to produce a constant luminance composite output signal.

What is claimed is:

1. A constant luminance corrector for use with an encoder having separate luminance and chrominance component signal channels, the encoder having as inputs conventional gamma-corrected luminance and chrominance component signals and providing as an output a composite signal formed from encoded luminance and chrominance component signals generated by the encoder, comprising:

means for processing input luminance and chrominance component signals to produce a luminance correction signal, the input luminance component signal being selected from the group consisting of the conventional gamma-corrected luminance component signal and the encoded luminance component signal and the input chrominance component signals being selected from the group consisting of the conventional gamma-corrected chrominance component signals and the encoded chrominance component signal together with a discarded chrominance component signal representing portions of the conventional gamma-corrected chrominance component signals lost during processing by the encoder to produce the encoded chrominance component signal; and means for combining the luminance correction signal with the conventional gamma-corrected luminance component signal at the input of the encoder so that the composite signal is a constant luminance composite signal.

2. The constant luminance corrector as recited in claim 1 wherein the processing means comprises:

means for generating an ideal luminance component signal and an actual luminance component signal from the input luminance and chrominance component signals; and means for combining the actual and ideal luminance component signals to produce the luminance correction signal.

3. The constant luminance corrector as recited in claim 2 wherein the generating means comprises:

means for converting the input luminance and chrominance component signals into linear color component signals; and means for converting the linear color component signals into the ideal luminance component signal.

4. The constant luminance corrector as recited in claims 2 or 3 wherein the generating means comprises:

means for producing received luminance and chrominance component signals from the input luminance and chrominance component signals;

means for converting the received luminance and chrominance component signals into received linear color component signals; and means for converting the received linear color component signals into the actual luminance component signal.

5. The constant luminance corrector as recited in claim 4 wherein the generating means further comprises:

means for converting the encoded and discarded chrominance component signals into the input chrominance component signals for input to the linear color component signal converting means; and means for converting the encoded chrominance component signal into the received chrominance component signals for input to the received linear color component signal converting means.

6. The constant luminance corrector as recited in claim 5 wherein the encoded and discarded chrominance component signals converting means comprises:

means for combining the encoded and discarded chrominance component signals into an intermediate encoded chrominance component signal; and a decoder for decoding the intermediate encoded chrominance component signal into the input chrominance component signals.

7. The constant luminance corrector as recited in claim 5 wherein the encoded chrominance component signal converting means comprises a decoder for decoding the encoded chrominance component signal into the received chrominance component signals.

8. The constant luminance corrector as recited in claim 3 wherein the input luminance and chrominance component signals converting means comprises:

an inverse matrix for producing gamma-corrected linear color component signals from the input luminance and chrominance component signals; and an inverse gamma corrector for producing from the gamma-corrected linear color component signals the linear color component signals.

9. The constant luminance corrector as recited in claim 3 wherein the linear color component signals converting means comprises:

a matrix for producing a luminance component signal from the linear color component signals; and a gamma correction circuit for producing the ideal luminance component signal from the luminance component signal.

10. The constant luminance corrector as recited in claim 4 wherein the producing means comprises:

an encoder for producing from the input luminance and chrominance component signals encoded luminance and chrominance component signals; and a decoder for producing from the encoded luminance and chrominance component signals the received luminance and chrominance component signals.

11. The constant luminance corrector as recited in claim 4 wherein the received luminance and chrominance component signals converting means comprises:

an inverse matrix for producing received gamma-corrected linear color component signals from the received luminance and chrominance component signals; and an inverse gamma corrector for producing the received linear color component signals from the gamma-corrected linear color component signals.

12. The constant luminance corrector as recited in claim 4 wherein the received linear color component signals converting means comprises:

a matrix for producing a luminance component signal from the received linear color component signals; and a gamma corrector for producing the actual luminance component signal from the luminance component signal.

13. A method of constant luminance correction for use with an encoder having separate luminance and chrominance component signal channels, the encoder having as inputs conventional gamma-corrected luminance and chrominance component signals and providing as an output a composite signal formed from encoded luminance and chrominance component signals generated by the encoder, comprising the steps of:

processing input luminance and chrominance component signals to produce a luminance correction signal, the input luminance component signal being selected from the group consisting of the conventional gamma-corrected luminance component signal and the encoded luminance component signal and the input chrominance component signals being selected from the group consisting of the conventional gamma-corrected chrominance component signals and the encoded chrominance component signal together with a discarded chrominance component signal representing portions of the conventional gamma-corrected chrominance component signals lost during processing by the encoder to produce the encoded chrominance component signal; and combining the luminance correction signal with the conventional gamma-corrected luminance component signal at the input of the encoder so that the composite signal is a constant luminance composite signal.

14. The method as recited in claim 13 wherein the processing step comprises the steps of:

generating an ideal luminance component signal and an actual luminance component signal from the input luminance and chrominance component signals; and combining the actual and ideal luminance component signals to produce the luminance correction signal.

15. The method as recited in claim 14 wherein the generating step comprises the steps of:

converting the input luminance and chrominance component signals into linear color component signals; and converting the linear color component signals into the ideal luminance component signal.

16. The method as recited in claims 14 or 15 wherein the generating step comprises the steps of:

producing received luminance and chrominance component signals from the input luminance and chrominance component signals;

converting the received luminance and chrominance component signals into received linear color component signals; and converting the received linear color component signals into the actual luminance component signal.

17. The method as recited in claim 16 wherein the generating step further comprises the steps of:

converting the encoded and discarded chrominance component signals into the input chrominance component signals for input to the linear color component signal converting step; and converting the encoded chrominance component signal into the received chrominance component signals for input to the received linear color component signal converting step.

\* \* \* \* \*